United States Patent
Loup et al.

[11] 3,903,923
[45] Sept. 9, 1975

[54] STABILIZED RELIEF VALVE

[75] Inventors: Ronald L. Loup, Clarkston; Samuel C. Walker, Ann Arbor, both of Mich.

[73] Assignee: Double A Products Company, Manchester, Mich.

[22] Filed: Mar. 11, 1974

[21] Appl. No.: 449,954

[52] U.S. Cl. ............ 137/539.5; 137/491; 137/540; 137/543.23
[51] Int. Cl.² .................. F16K 15/02; F16K 15/04
[58] Field of Search ... 137/529, 539.5, 540, 543.17, 137/543.21, 543.23, 491

[56] References Cited
UNITED STATES PATENTS

| | | | |
|---|---|---|---|
| 696,736 | 4/1902 | Howard | 137/543.23 |
| 1,491,683 | 4/1924 | Konnell | 137/543.23 X |
| 1,998,056 | 4/1935 | Naatz et al. | 137/543.23 |
| 3,302,662 | 2/1967 | Webb | 137/539 |
| 3,336,942 | 8/1967 | Keith et al. | 137/529 |

FOREIGN PATENTS OR APPLICATIONS

| | | | |
|---|---|---|---|
| 500,420 | 2/1939 | United Kingdom | 137/529 |
| 893,153 | 10/1953 | Germany | 137/543.17 |

*Primary Examiner*—Alan Cohan
*Assistant Examiner*—Gerald A. Michalsky
*Attorney, Agent, or Firm*—Olsen and Stephenson

[57] ABSTRACT

A pressure relief valve for a hydraulic system wherein a coil spring is used in conjunction with a valve member to urge the valve member to its closed position. A stabilizer element is mounted adjacent to the valve member to restrain lateral displacement of the valve member when open so as to eliminate a flutter normally associated with relief valves. The stabilizer element is used with either conical type or ball type valve members.

13 Claims, No Drawings

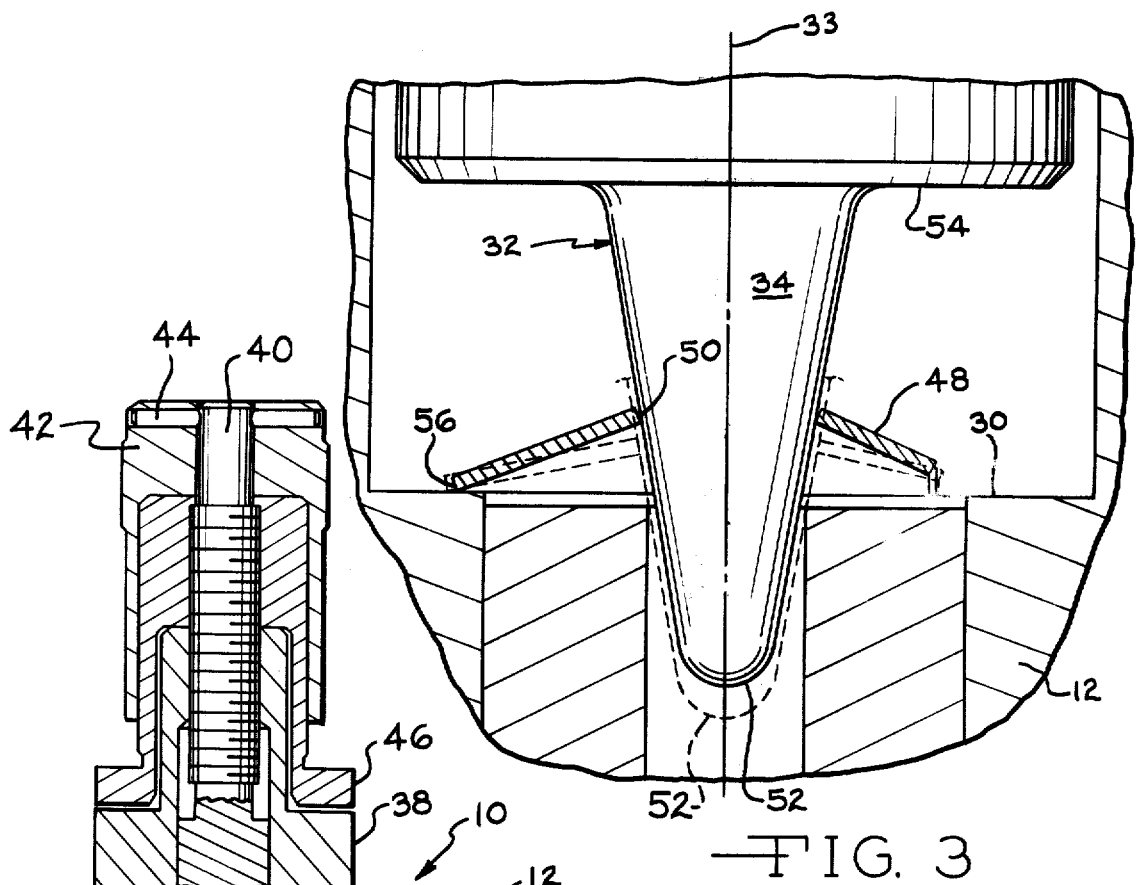
FIG. 3
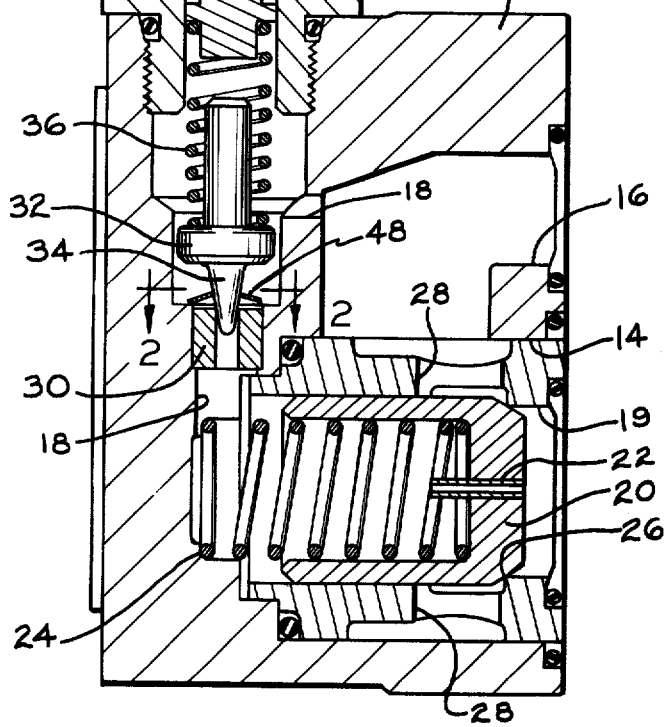
FIG. 2
FIG. 1

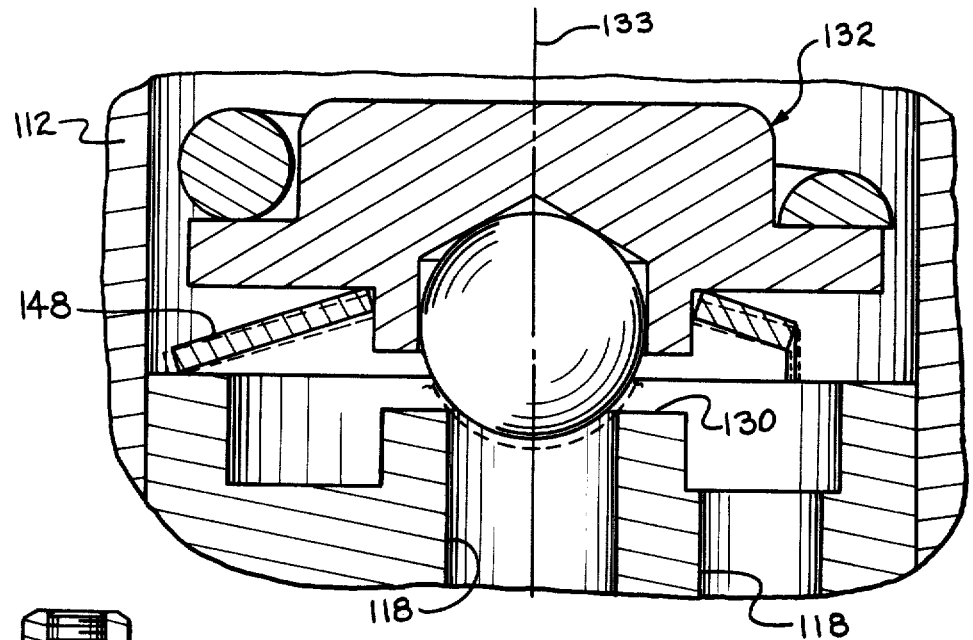
FIG. 5
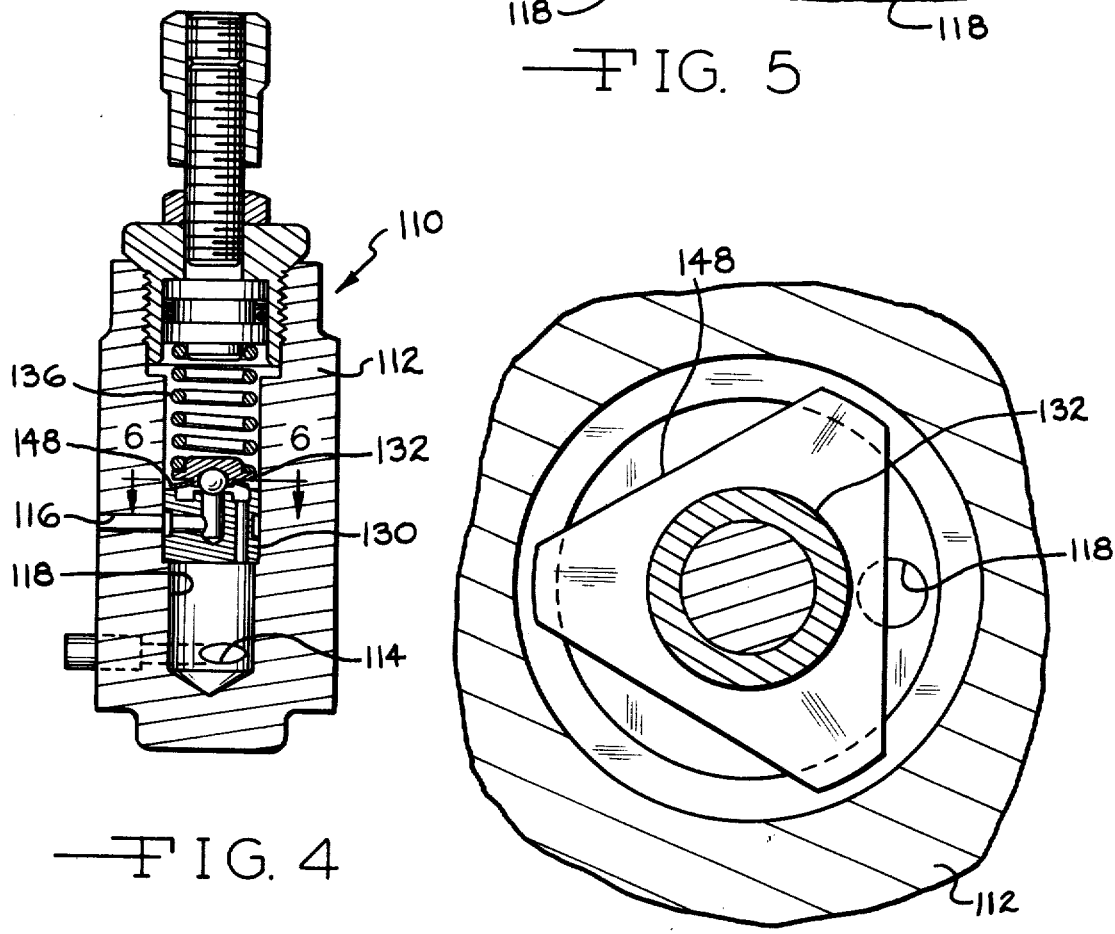
FIG. 4
FIG. 6

STABILIZED RELIEF VALVE

BACKGROUND OF THE INVENTION.

The present invention relates to pressure relief valves, particularly of the type that employ a compression coil spring as a component for urging a valve member to a closed position, and wherein the valve member is responsive to a pressure differential of predetermined magnitude to open to provide pressure relief.

In relief valves of this character, it is undesirable to restrain axial movement of such coil springs, and therefore, clearance is usually provided between the spring and the valve body to eliminate frictional restraints. Coil springs are unstable in a transverse direction and consequently are unable to counteract the tendency of the valve members to move in a transverse direction or cock when lifted off the valve seat under the influence of fluid under pressure and flow. This off-center or cocking movement will result in pressure differentials across the valve member which will cause chatter and excessive wear, and will cause high frequency noises which are characteristic of valves of this type. The problem of chatter or undesirable noise can be partially solved by guiding the valve member, but valves having guide means suffer the disadvantage that the guide means induce a substantial amount of friction which restrains free axial movement of the spring and valve member, resulting in inconsistent and erratic valve operation. Further, such guide means substantially increase the cost of the valve because of the close tolerance required. The ideal requirements for a good relief valve are that it be one which can be economically produced while having the characteristics of repeatability, non-leakage, stability and noiselessness. The relief valves taught by the prior art fail to meet fully all of these requirements.

SUMMARY OF THE INVENTION.

The present invention has overcome the inadequacies of the prior art by including as a component of the relief valve a stabilizer element which can be added as a component to existing relief valves without substantially increasing the cost thereof, and when so used will substantially improve the operating characteristics of the relief valve.

According to one form of the present invention, a relief valve is provided having a valve body with an inlet port, an outlet port and a passageway extending between the inlet and outlet ports. A seat member or means in the passageway, a valve member in the passageway normally seated on the seat member for closing the passageway and movable along an axis toward and away from the seat member, the valve member being spaced from the passageway except for engagement with the seat member, and a coil spring operably mounted at its opposite ends between the valve member and the valve body urging the valve member to its seated position and located so that when the valve member is seated the coil spring axis is coincident with the axis of movement of the valve member. The coil spring is also spaced from the passageway except for its mounting engagement at one end with the valve body. A stabilizer element is operatively positioned between the seat member and the valve member maintaining an axial load or force therebetween when the valve member is moved to its open position so as to restrain frictionally lateral displacement of the valve member when in its open position. Thus, the stabilizer element will provide resistance against lateral displacement of the valve member but will not interfere with the normal opening and closing of the valve member as influenced by the coil spring or the pressure differential acting on the valve member.

The stabilizer element preferably is in the form of a star-shaped conical spring washer, and the valve member may be either a conical-shaped valve member or a ball type valve member as are conventionally used in relief valves of this type.

Thus, it is an object of the present invention to provide an improved stabilized relief valve.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS.

FIG. 1 is a longitudinal section of a relief valve embodying the present invention wherein a conical valve member is one component of the relief valve;

FIG. 2 is a fragmentary transverse section taken on the line 2—2 of FIG. 1;

FIG. 3 is an enlarged fragmentary section illustrating the positioning of the stabilizer element with respect to the valve and seat members of the relief valve;

FIG. 4 is a longitudinal sectional view of another relief valve embodying the present invention wherein a ball type valve member is used as one of the components of the relief valve;

FIG. 5 is an enlarged fragmentary section showing details of the stabilizer element positioned between the valve member and the seat member; and FIG. 6 is an enlarged fragmentary section taken on the line 6—6 of FIG. 4.

DESCRIPTION OF THE PREFERRED EMBODIMENTS.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, the embodiment of the invention illustrated in FIGS. 1-3, inclusive, will now be described. The relief valve 10 includes a valve body 12 with an inlet port 14 and an outlet port 16. A passageway 18 extends between the inlet port 14 and the outlet port 16. Fitted into the inlet port 14 is the sleeve 19 in which is mounted a main spool 20 containing a small tube 22 therein. This tube provides a restricted passageway for flow of fluid from the inlet or high pressure side of the spool to the downstream side against which a coil spring 24 normally biases the main spool 20 against the seat 26 in the sleeve 19. When the pressure differential acting on the spool 20 is sufficiently great to overcome the spring pressure of the coil spring 24, the spool will be unseated to permit flow of fluid through the ports 28 to the outlet port 16. If fluid pressure on the downstream side of the spool 20 should drop an amount greater than the spring pressure acting on the spool, the latter will move to an open position. Such a pressure drop can be produced by opening a pilot valve, which will now be described.

Located in the passageway 18 is the seat means which includes the seat member 30, the valve means or conical valve member 32 adapted for movement on axis 33 and which has its conical portion 34 normally seated on the seat member 30 so as to close the opening therein, and the coil spring 36 operably mounted at its opposite ends between the conical valve member 32 and the valve body 12 urging the conical portion 34 to its seated position. Without departing from the present invention, the seat member 30 may be wholly an internal part of the valve body 12, or it may be a separate element fitted into the valve body 12, as is shown in the illustrated embodiment of the invention. As can be seen best in FIG. 1, the conical valve member 32 and the coil spring 36 are spaced from the passageway 18 except for engagement of the conical valve member with the seat member and the operable mounting of the coil spring 36 at its one end with the valve body 12.

Threadedly connected to the valve body 12 and in axial alignment with the conical valve member 32 is the retainer 38 to which is threadedly connected the adjusting screw 40. The latter includes a cap 42 which is connected to the adjusting screw 40 for rotation therewith by means of the pin 44. A lock nut 46 is also threadedly connected to the adjusting screw 40 and is adapted to be seated at the upper end of the fitting 38 for locking the adjusting screw 40 in its set position for controlling the compression exerted by the coil spring 36 on the conical valve member 32.

The apparatus described above is known in the prior art and is subject to certain problems inherent in apparatus of this type, such as are discussed above. In the normal operation of the hydraulic system containing the pressure relief valve 10, the spool 20 will remain in its seated position so long as the pressure differential, including the pressure exerted by the main spring 24, acts to urge the spool 20 to its closed position. If the fluid pressure within the passageway 18 exceeds the setting of the conical valve member 32 through the compression spring 36, the conical valve member 32 will be unseated thereby producing a pressure drop behind the spool 20, and when the pressure drop of the hydraulic fluid is sufficient to overcome the pressure exerted on spool 20 by the main spring 24, the spool 20 will unseat allowing high pressure fluid to flow through the inlet port 14 and out of the discharge port 16 via the ports 28.

In the operation of the valve 10, in the absence of stabilizing means, the conical valve member 32 will be substantially free to move laterally, thereby creating the undesirable conditions discussed above.

A significant feature of the present invention is the incorporation of the stabilizer element 48 into the pressure relief valve 10. In the illustrated form of the invention, the stabilizer element 48 is a resilient annular conical washer having a star shape. Other suitable elements which have lateral stiffness or stability while providing necessary axial resilient properties may also be used. As seen best in FIG. 3, the inner periphery 50 of the stabilizer element 48 has its inner circumference seated against the conical portion 34 between the apex 52 and the base 54 thereof so that the inner circumference will move with the conical portion 34 only in an axial direction. The outer periphery 56 of the resilient annular conical washer 48 is in frictional engagement with the valve body 12, and because of the resilient properties of the annular conical washer 48 which allows it to expand and contract axially, the outer periphery will remain in frictional engagement with the valve body 12 throughout the normal stroke of the conical valve member 32 as can be seen by the solid and broken lines in FIG. 3. The broken lines show the apex of the conical portion in its maximum extent of penetration into the opening in the seat member 30, and in that position the conical washer is shown pressed against the valve body 12 or that portion of the seat member 30 that is an integral part of the valve body 12. When the conical portion 34 is unseated, the outer periphery of the conical washer will remain in frictional engagement with the valve body 12 because of the flexing of the washer, and thereby the conical washer will be restrained against lateral movement with respect to the seat member 30. This restraint is also imparted directly to the conical portion 34 so that when the conical valve member 32 is unseated, it will be held against lateral displacement. It has been discovered that the force necessary to restrain lateral displacement is quite minimal and that a small force acting in this manner as a restraint against the conical valve member 32 is sufficient to maintain the conical valve member against lateral displacement when open. Thus, undesirable chatter and noises are eliminated.

In the illustrated embodiment the outer periphery of the stabilizer element 48 is shown in engagement with the valve body 12, but as previously explained, it is immaterial to the present invention whether the stabilizer element 48 is in engagement with the valve body 12 or seat member 30. In any event the outer periphery 56 of stabilizer 48 is seated on a stationary surface, and the inner edge 50 of stabilizer 48 is in engagement with movable valve member 32.

Referring now to FIGS. 4, 5 and 6, a second embodiment of the present invention will be described. In this form of the invention, a relief valve 10 is shown having a valve body 112 with an inlet port 114, an outlet port 116, and a passageway 118 extending therebetween. Seat means which define a seat member 130 which may be either a separately formed component or an integral part of valve body 112, is located in the passageway 118 and a ball-and-follower member 132 is positioned to extend into the opening in the seat member 130 and is normally seated thereon for closing the passageway 118. As can be seen best in FIG. 4, the valve member 132 is spaced from the passageway 118 except for engagement of its ball portion with the seat member 130. The valve member 132 is movable along an axis 133 toward and away from the seat member 130. A coil spring 136 is operably mounted at its opposite ends between the ball-and-follower valve member 132 and the valve body 112. It urges the ball portion of the ball-and-follower valve member 132 to its seated position and is located so that when the valve member 132 is in its seated position the axis of the coil spring 136 is coincident with the axis of movement of the valve member 132. The coil spring 136 is also spaced from the passageway 118 except for its operable mounting with the valve body 112. The structure defined above with respect to FIG. 4 is known in the prior art, and the improvement comprises the insertion of a stabilizer element 148 between and into engagement with the seat member 130 and the ball-and-follower valve member 132, continuously maintaining a fixed engagement with the valve member 132 and continuously maintaining frictional engagement with the seat member 130. When the valve member 132 is moved to its open position the stabilizer element 148 will restrain lateral displacement of the valve member in the same manner as was described above in connection with the embodiment of the invention illustrated in FIGS. 1–3, inclusive.

In this embodiment of the invention, the inner periphery of the stabilizer element 148 encircles a portion of the follower and is in engagement therewith substantially in a plane that is perpendicular to the axis of movement of the valve member 132 and that passes through the center of the ball confined within the follower.

From the foregoing description it will be recognized that a low-cost and simple apparatus has been developed for use in connection with pressure relief valves which will eliminate chatter inherent in coil spring-actuated valve members and will also eliminate the undesirable sounds associated with such pressure relief valves. Further, the stability and repeatability of the valves is substantially improved and apparatus is provided which is characterized by its lack of susceptibility to contamination and to undesirable leakage problems.

It is claimed:

1. A valve having a valve body with an inlet port, an outlet port and a passageway extending between said inlet port and said outlet port, seat means defining a seat member providing an opening in said passageway, a valve means in said passageway normally seated on said seat member for closing the passageway and movable along an axis toward and away from said seat member, said valve means being spaced from said passageway except for engagement with said seat member, a coil spring operably mounted at its opposite ends between said valve means and said valve body urging said valve means to its seated position and located so that when the valve member is seated the coil spring axis is coincident with the axis of movement of the valve means, said coil spring being spaced from said passageway except for its mounting engagement at one end with said valve body, and an annular stabilizer element encircling said valve means and positioned between and in engagement with said seat means and said valve means maintaining frictional engagement therebetween, said annular stabilizer element being resilient in the axial direction to allow it to expand and contract axially for maintaining said frictional engagement when the valve means is in an open position and being stiff in the radial direction to restrain it from movement laterally so that when the valve means is in an open position the stabilizer element will restrain frictionally lateral displacement of the valve means relative to the seat means.

2. The valve that is defined in claim 1, wherein said stabilizer element is a resilient washer which encircles said valve means and has resilient axial properties and lateral stability.

3. The valve that is defined in claim 2, wherein said resilient washer is star-shaped.

4. The valve that is defined in claim 1, wherein said valve means is a conically-shaped member which normally is positioned with its apex projecting into the opening in the seat member when urged into seating engagement with said seat member.

5. The valve that is defined in claim 4, wherein said stabilizer is a resilient washer which encircles said conically-shaped member and has an internal diameter smaller than the diameter of the base of said conically-shaped member and larger than the area of said opening, the outer periphery of said washer seating in frictional engagement on said seat member.

6. The valve that is defined in claim 1, wherein said valve means is a ball normally seated on its one side on said seat member, and a follower partially enclosing the other side of said ball urging the latter into its seated position in response to the action of said coil spring.

7. The valve that is defined in claim 6, wherein said stabilizer is a resilient washer and which has an inner periphery that encircles a portion of said follower and is in engagement therewith substantially in a plane perpendicular to said axes and passing through the center of said ball, the outer periphery of said washer seating in frictional engagement on said seat member.

8. A relief valve having a valve body with an inlet port, an outlet port and a passageway extending between said inlet port and said outlet port, seat means defining an annular seat member in said passageway, a conical valve member in said passageway having a conical portion with the apex thereof extending into the opening in the annular seat member and normally seated on said seat member for closing the passageway, said conical valve member being spaced from said passageway except for engagement of its conical portion with said seat member and being movable along an axis toward and away from said seat member, a coil spring operably mounted at its opposite ends between said conical valve member and said valve body urging said conical portion to its seated position and located so that when the conical valve member is in its seated position the axis of said spring is coincident with the axis of movement of said conical valve member, said coil spring being spaced from said passageway except for its operable mounting at one end with said valve body, and a stabilizer element positioned between and in engagement with said seat member and said conical valve member having axial resilience so as to maintain continuously fixed engagement with one of said members and frictional engagement with the other of said members when relative axial movement therebetween occurs and having radial stiffness so that when the valve member is moved to its open position the stabilizer element will restrain the valve member against lateral displacement thereby preventing vibration of the valve member relative to the seat member.

9. The relief valve that is defined in claim 8, wherein said stabilizer element is a resilient annular conical washer.

10. The relief valve that is defined in claim 9, wherein said resilient annular conical washer has its inner circumference seated on the conical portion of the valve member and its outer peripheral extremities seated in frictional engagement with said valve seat member.

11. A relief valve having a valve body with an inlet port, an outlet port and a passageway extending between said inlet port and said outlet port, seat means defining an annular seat member in said passageway, a ball-and-follower valve member in said passageway having the ball portion thereof extending into the opening in the annular seat member and normally seated on said seat member for closing the passageway, said valve member being spaced from said passageway except for engagement of its ball portion with said seat member and being movable along an axis toward and away from said seat member, a coil spring operably mounted at its opposite ends between said ball-and-follower valve member and said valve body urging the ball portion to its seated position and located so that when the valve member is in its seated position the axis of the spring is coincident with the axis of movement of said valve member, said coil spring being spaced from said passageway except for its operable mounting with said valve body, and a stabilizer element positioned between and in engagement with said seat member and said ball-and-follower valve member having axial resilience so as to maintain continuously fixed engagement with one of said members and frictional engagement with the other of said members when relative axial movement therebetween occurs and having radial stiffness so that when the valve member is moved to its open position the stabilizer element will restrain the valve member against lateral displacement thereby preventing vibration of the valve member relative to the seat member.

12. The relief valve that is defined in claim 11, wherein said stabilizer element is a resilient annular conical washer.

13. The relief valve that is defined in claim 12, wherein said resilient annular washer has its inner circumference seated on the follower portion of said valve member and its outer peripheral extremities seated in frictional engagement with said seat member.

* * * * *